Oct. 4, 1932.     J. M. COLE     1,880,815
SPEED RESPONSIVE MECHANISM AND VEHICLE SIGNALING
Filed Aug. 3, 1921
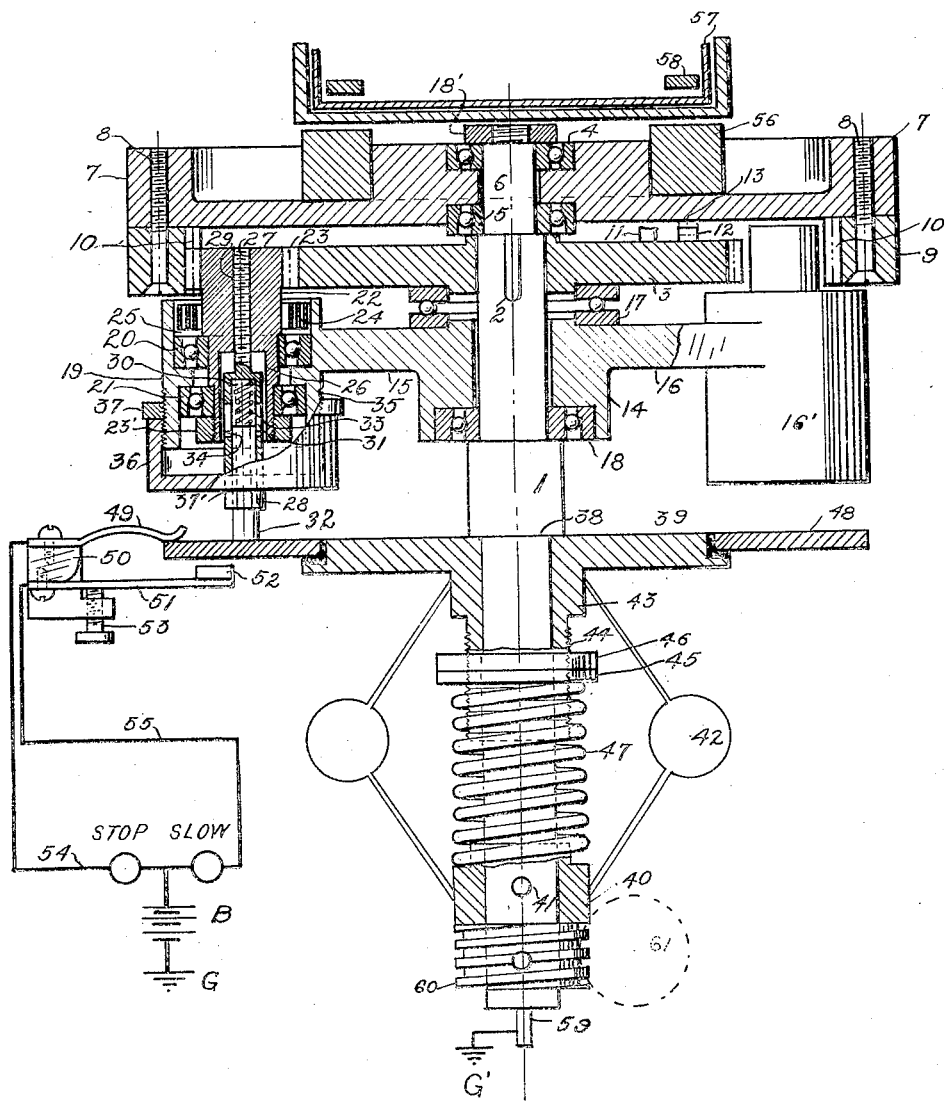
Inventor
John M. Cole Patented Oct. 4, 1932

1,880,815

UNITED STATES PATENT OFFICE

JOHN M. COLE, OF NEW YORK, N. Y.

SPEED RESPONSIVE MECHANISM AND VEHICLE SIGNALING

Application filed August 3, 1921. Serial No. 489,566.

This invention relates to speed responsive mechanism, and more particularly to one which will indicate whether a mechanism is at rest, or whether it is slowing down or decelerating.

Such a mechanism may be advantageously used on automobiles or street cars operating suitable indicating devices to inform observers that the vehicle carrying the mechanism is at rest, or is decelerating.

Devices for indicating "slow" on an automobile have heretofore been manually operated, or have been operated in response to the application of the brakes or to the movement of some other part of the car which usually changes position when the vehicle is slowing down. The former devices are unsatisfactory because they require the attention of the driver, while the devices of the latter type are unsatisfactory by reason of the fact that slowing down is not always accompanied by an application of the brakes.

It is an object of my invention to provide a device for use on vehicles or with other types of mechanism to automatically respond to and/or indicate the state of rest and/or the state of deceleration.

A further object of my invention is to provide a device in which the slow indication is automatically discontinuing after the mechanism has come to a normal state at a lower speed, or is replaced by the "stop" indication when the vehicle comes to rest.

A further object of my invention is to provide a device which has substantially the same sensitivity at various speeds (the rate of deceleration being the same) thereby compensating for the increase of centrifugal force with the square of the speed.

Another object is to associate mechanism of the above type with a speedometer, and have certain of the parts of the speedometer function as parts of the speed responsive mechanism.

The drawing represents one of the many embodiments in which my invention may take form.

According to the embodiment herein illustrated, a member such as shaft 1 is caused to rotate at a speed directly proportional to that of the mechanism to which it is connected. In case this is an automobile, the revolutions of this shaft will bear a fixed ratio to the speed of the car. The key 2 fixes a comparatively small gear 3 on the shaft 1. Ball bearings 4 and 5 on reduced portion 6 of the shaft 1 support a fly-wheel 7 to which is fastened by screws 8 a member 9 having internal gear teeth 10. These internal gear teeth are of the same pitch as the teeth on the outside of gear wheel 3. The gear 3 is provided with two abutments 11 and 12, while the fly-wheel member 7 is provided with an abutment 13. These abutments operate as stops and limit the angular movement of the fly-wheel and parts carried thereby relative to the gear 3. It is of course obvious that any other sort of a lost-motion connection could be used.

A member 14 having arms 15 and 16 is carried underneath the small gear 3 and is preferably loosely mounted on bearings 17 and 18. These foregoing parts are held on the shaft 1 by means of nut 18'. The arm 15 is provided with a tubular member 19 which supports, preferably, by means of bearings 20 and 21, a member or shaft 22 having a gear 23, which meshes with the internal gear teeth 10 and with the gear teeth on the small gear 3. The nut 23' holds the shaft 22 and bearings in place. The gear 23 may be termed a planet gear, and it will assume various positions relative to the internal gear depending upon the position of the internal gear relative to the gear 3. A coiled spring 24 is carried in the recess 25 of the tubular member 19 directly above the bearing 20. This spring is fastened at one end to the tubular member 19 and at the other end to the shaft 22.

The mode of operation of the parts so far described is as follows (the description being made with reference to a vehicle),—when the vehicle is being driven at a constant speed or at an increasing speed, the shaft 1 will drive the gear wheel 3 at a speed directly proportional to the vehicle speed. One of the abutments, say the abutment 12, will engage the abutment 13 on the fly-wheel together with the internal gear at the same speed. There can be no rotation of the planet gear about its own axis; it will, instead, revolve about the shaft 1 as an axis, carrying the member 14 with it. Now, in case the automobile should slow down, the gear 3 would of course turn slower but the internal gear with the fly-wheel having high inertia would tend to run ahead of, or lead, the small gear 3. The amount of the relative advance of the fly-wheel would depend upon the energy available during the drop in speed and the characteristics of spring 24, and would be limited by the angular spacing of the stops 11 and 12. During this slowing down of the vehicle, the fly-wheel and internal gear will act as a driver and will cause the internal gear 10 to revolve about the shaft 1 at a speed different from that of this shaft, thereby causing the planet gear 23 to rotate on its own axis. This rotation is opposed by the spring 24. When the vehicle stops, or has been running some time at the reduced speed, or when its speed is again increased, the abutment 13 of the fly-wheel will be brought against the abutment 12 on the gear 3.

The member 22 has a recess 26 near its lower end and has a threaded hole 27 axially arranged. A member 28, the upper end of which is threaded at 29 is associated with the threads 27 while the lower portion of the member 28 is larger and is adapted to occupy the recess 26 as indicated. The lower portion of the member 28 has a non-circular exterior, in the illustration being shown as hexagonal, and is provided with a recess 30 and with a pair of slots 31. A movable contact member 32 carried in the recess 30 is urged downwardly by means of a small coiled spring 33. It is held within the recess by a pin 34 which co-operates with the slots 31.

The lower end of the tubular member 19 is threaded at 35. These threads co-operate with a cap 36 and a lock-nut 37. The cap member 36 is provided with a non-circular aperture 37' to co-operate with the non-circular portion of the member 28. The arm 16 of the member 14 is weighted at 16' to counterbalance the tubular member 19 and parts carried thereby.

The rotation of the member 22 about its own axis, in the manner above described, will unthread the member 28 which is held from rotation relative to its own axis by means of the non-circular aperture 37' in the cap member 36. This unthreading of the member 28 will move the member 28 together with the contact point 32 downward.

This shaft 1 is also provided with a shoulder 38 against which the movable member 39 of a governor mechanism is adapted to abut when at rest. The drawing conventionally illustrates a form of governor mechanism which may be used to move member 39 downward according to the speed of the mechanism and the characteristics of the governor. A member 40 is pinned to the shaft 1 by the pin 41. A plurality of governor weights 42 are connected to the member 40 and to the hub 43 of the member 39. The lower portion of the hub 43 is screw-threaded at 44 and is provided with a nut 45 and a lock-nut 46 by means of which the spring 47 may be adjusted. The movement of the member 39 may be made to depend upon the adjustment of this spring 47. A circular plate 48 is carried by the member 39 and is insulated from it.

An upper contact 49 supported on an insulating block 50, is adapted to contact with the circular plate 48 when the member 39 is against the shoulder 38. The block 50 also carries a second spring contact member 51 which is preferably provided with a carbon button 52. This contact is adjustable by means of a screw 53.

The contacts 49 and 51 are connected to suitable instrumentalities to indicate that the vehicle is at rest or decelerating. These instrumentalities may, in the case of an automobile be electric lamps arranged at the rear of the vehicle. In the drawing, these instrumentalities are diagrammatically illustrated. A lead 54 is connected with the contact 49 and with a lamp which indicates "Stop", while the contact 51 is connected to a lead 55 which is also connected to a lamp which indicates "Slow". These two lamps are each connected with a battery B which is grounded at G.

When the apparatus is at rest, the locking-cap 36 may be adjusted. In adjusting this locking cap, the member 28 is moved up or down so that the contact 32 is held against the upper surface of the plate 48 by slight pressure developed in the spring 33. Lock-nut 37 is then brought against the locking-cap 36 and the parts locked in place. Adjustment of the cap 36 may also be made to compensate for any wear in the contact 32. The circuit may then be traced from the battery B through the "STOP" lamp, lead 54, contact 49, circular plate 48, contact 32 through the mechanism to the shaft 1, and thence to the ground G'.

Now, when the mechanism is started, the centrifugal force developed in the balls 42 of the governor will move the plate 48 down into a position which is determined by the speed and the characteristics of the governor. This will open the "Stop" circuit between the plate 48 and the contact 49 and as soon as the speed has increased to the proper amount, will bring the plate 48 into contact with the carbon button 52. Further increase in speed will flex the contact member 51, but the carbon button will offer only a slight friction. Now when the mechanism or vehicle is slowed down either from coasting, the application of the brake, unfavorable grade, or from diminishing the power supply, the fly-wheel 7, together with the internal gear will run ahead of the shaft 1. This, as before described, will rotate the planet gear 23 on its axis and cause an unthreading of the member 28. The amount of the unthreading is limited by the angular spacing of the stops 11 and 12. The unthreading of the member 28 will bring the contact 32 against the plate 48 and the circuit connections will then be as follows: From the battery B to the "SLOW" lamp, lead 55, contact arm 51, carbon button 52, plate 48, in the ground by way of contact 32.

From the foregoing it is apparent that the device so far described will automatically indicate that the mechanism or vehicle is at rest, by means of the lamp marked "Stop". It will also indicate that the mechanism or vehicle is moving at a speed slower than the speed at which it was operating a short time before. The distance through which it will be necessary for the contact 32 to move is dependent upon the speed and the characteristics of the governor. Hence, the apparatus may be so arranged that at low speeds, when there is but comparatively small energy stored in the fly-wheel, the travel of the contact 32 will be relatively small, while at high speeds, when the energy in the fly-wheel is very much greater, the travel will also be greater.

These inertia devices are essentially governors and their design follows, to a large extent, the design of a steam engine governor. In inertia devices the kinetic energy of the movable masses varies with the square of the velocity, and, hence, it is necessary to design governors to work within a certain predetermined range of speed. The usual governor which would control an engine, say of a thousand revolutions, might be designed to hold it within ten revolutions of 1000 R. P. M.

The kinetic energy at 1010 revolutions is 1,020,100 units, while the kinetic energy at 990 revolutions is 980,100, a difference of 40,000 units. If this is the amount of energy required to actuate the governor between these speeds, and I try to use this same governor to work at 500 revolutions, I find that the difference, 40,000 units, will permit the speed variation between 480 and 520 revolutions. If the speed were again reduced to say 200 or 300 revolutions per minute, there would not be enough energy to operate the governor at all. If, on the other hand, the speed were increased to 2000 revolutions, I would have 4,000,000 energy units available, and a difference of 40,000 would be obtained by changing the speed from 1995 revolutions to 2005 revolutions, and I would then govern within five revolutions.

From the foregoing it will be seen that the sensitivity of a centrifugal device varies greatly with the speed at which it is operated. If it is plotted, it becomes a parabola.

In ordinary governor design one works with a reasonably constant speed and with a narrow range of speeds, and, hence, this change of sensitivity of the governor with varying speed is of little consequence. When, however, I attempt to incorporate an inertia mechanism into a motor vehicle signal which operates at a wide range of speeds, as is well known, I cannot use the simple governor. The operation of the two inertia mechanisms of the structure herein shown is so interrelated that the device acts in response to deceleration of the vehicle. The deceleration responsive means is associated with the speed controlled means so as to be effective through a range of speeds for modifying the sensitivity of the signal. In this manner I am able to make such combination that the device is suitable for use through a wide range of speed through which motor vehicles are operated.

The reversal of the mechanism, or the backing up of the vehicle, will not injure the device. The operation will be as follows,—the drive will then be from the shaft 1 through the stop 11 to the fly-wheel. The planet gear 22 will then be moved to such a position as to unthread the member 28 moving the contact 32 down against the plate 48. This will merely compress the spring 33. The indication will be "Stop" unless the backward speed is sufficient to open the circuit between the contact 49 and plate 48. In such case, there will be no indication until the speed of the vehicle is sufficient to bring the plate 48 against the contact 52.

When the mechanism heretofore described is to be used on an automobile, it may be advantageously associated with the speedometer, as indicated in the drawing. The rotating magnet 56 of the speedometer is carried on the fly-wheel 7, thereby adding to the inertia of the fly-wheel. The moving element of the speedometer is indicated at 57 and the upper fixed steel ring at 58. The lost motion drive for the magnet damps out many of the vibrations of the moving element, especially when the speed is rapidly changing. At the lower end of the shaft 1 there is shown the usual male connection 59 for driving the speedometer shaft together with the worm 60 for driving the first worm wheel 61 of the distance counting mechanism.

While in the foregoing specification, a detailed description has been given of one embodiment of the device for the purposes therein set forth and but one form has been illustrated in the drawing, I desire it to be understood that the drawing and description are illustrative of the invention and do not limit the same, for it may be embodied in other forms of device and certain parts with their functions may be omitted for certain purposes. The device is of general application and it is not necessarily limited for use on motor-vehicles.

What I claim is:

1. A signaling device for indicating decelerating of vehicles, said device having means for automatically indicating that the vehicle is at rest, deceleration responsive means to produce a prolonged indication during the time that the vehicle speed is being reduced, and speed controlled means associated with the deceleration responsive means and effective through a range of speeds for modifying the sensitivity of the signal so as to have substantially uniform sensitivity through a wide range of speeds.

2. A signaling device for indicating the deceleration of vehicles, said device having a signal, means for automatically operating the signal when the vehicle is at rest, a second signal, deceleration responsive means to produce a prolonged indication of the second signal during the time that the vehicle speed is being reduced, and speed controlled means associated with the deceleration responsive means and effective through a range of speeds for modifying the sensitivity of the signal so as to have substantially uniform sensitivity through a wide range of speeds.

3. A signaling device for indicating decelerating of vehicles, said device having means for automatically indicating that the vehicle is at rest, deceleration responsive means to produce a prolonged indication during the time that the vehicle speed is being reduced, speed controlled means associated with the deceleration responsive means and effective through a range of speeds for modifying the sensitivity of the signal so as to have substantially uniform sensitivity through a wide range of speeds, and means acting solely through the deceleration responsive means to discontinue the latter indication when the vehicle is running at a uniform speed or is accelerating.

4. A vehicle signaling system having a signal adapted to indicated "slow" and an instrumentality for operating the signal, which instrumentality is of non-uniform sensitivity at varying speeds and automatically assumes one condition during the time in which the vehicle is decelerating whereby the signal is actuated and another condition when the speed is constant or is increasing whereby the signal is withdrawn, and speed controlled means effective through a range of speeds for modifying the sensitivity of the signal so as to have substantially uniform sensitivity through a wide range of speeds.

5. A vehicle signaling system having provisions for indicating "slow" during the time in which the vehicle is decelerating and for indicating "stop" when the vehicle is at rest, and means automatically responsive to vehicle movement for operating the indicating devices, said means including an energy storing fly-wheel adapted to give up kinetic energy in amounts depending upon the square of the speed when the vehicle is decelerating, an energy absorbing spring adapted to absorb energy from said fly-wheel, and speed controlled means operating at a speed proportional to vehicle speed and effective through a range of speeds for modifying the sensitivity of the first-named means so as to have substantially uniform sensitivity through a wide range of speeds.

6. In a speed responsive mechanism, a driving means, a first driven element whose speed is directly proportional to the speed of the driving means, a second energy-storing driven element having a lost motion driving connection in the drive therefor from the driving means whereby its speed is also directly proportional to the speed of the driving means during acceleration or at substantially constant speeds and whereby during the period of deceleration the energy-storing element may advance relative to the driving means and first driven element, and remain in the advanced position, a first contact, a second contact, means for mounting said second contact in spaced relation to the said first contact, means responsive to the speed of said driving means to change the spacing of said contacts, and means for moving said first contact toward said second contact and in response to relative motion between said elements.

7. In a speed responsive mechanism, a fly-wheel having a gear, a second gear, lost motion driving connections for the fly-wheel whereby the fly-wheel may maintain a higher speed than the second gear on deceleration of the latter, and shiftably mounted gearing interconnecting the gear on the fly-wheel and the second gear, said gearing being shifted as the first and second gears change their relative positions against the gearing.

8. In a speed responsive mechanism, a fly-wheel having a gear, a second gear, lost motion driving connections for the fly-wheel whereby the fly-wheel may maintain a higher speed than the second gear on deceleration of the latter, gearing interconnecting the gear on the fly-wheel and the second gear, and an energy-storing spring operating against the gearing to oppose the fly-wheel.

9. In a speed responsive mechanism, a fly-wheel having a gear, a second gear, lost motion driving connections for the fly-wheel whereby the fly-wheel may maintain a higher speed than the second gear on deceleration of the latter, a planet gear interconnecting the gear on the fly-wheel and the second gear, and an energy-storing spring operating against the gear to oppose the fly-wheel.

10. In combination, a planet gear, a support therefor, and means to move an element along the axis of the planet gear on rotation of the gear about its own axis, comprising co-operating screw-threaded connections between the element and planet gear, and means to prevent rotation of the element about its own axis.

11. In combination a planet gear, a support therefor, means to move an element along the axis of the planet gear on rotation of the gear about its own axis, comprising co-operating screw-threaded connections between the element and planet gear and means to prevent rotation of the element about its own axis, and a circuit closer operated by the axial movement of the element.

12. In combination a planet gear, a support therefor, means to move an element along the axis of the planet gear on rotation of the gear about its own axis, comprising co-operating screw-threaded connections between the element and planet gear and means to prevent rotation of the element about its own axis, and means to adjust the element along the said axis.

13. In a speed responsive mechanism, in combination, a shaft, a planet gear, means to revolve the planet gear about the shaft at the speed of the shaft during acceleration or at substantially constant speed, and means to rotate the planet gear about its own axis on deceleration of the shaft.

14. In a speed responsive mechanism, in combination, a shaft, a planet gear, means to revolve the planet gear about the shaft at the speed of the shaft during acceleration or at substantially constant speed, means to rotate the planet gear about its own axis on deceleration of the shaft, an energy storing spring to oppose the rotation of the planet gear, and a revolvable non-rotatable element interconnected with the planet gear to be moved axially when the planet gear rotates.

15. In a speed responsive mechanism, in combination, a shaft, a planet gear, means to revolve the planet gear about the shaft at the speed of the shaft during acceleration or at substantially constant speed, a fly-wheel having a lost-motion driving connection with the shaft to rotate the planet gear about its own axis on deceleration of the shaft, an energy storing spring to oppose the rotation of the planet gear, and a revolvable non-rotatable element interconnected with the planet gear to be moved axially when the planet gear rotates.

16. In a speed responsive mechanism, in combination, a shaft, a contact surface, a contact making element, means for revolving the contact making element about the shaft, means to move the contact making element against the contact surface during the time in which the shaft decelerates, and speed controlled means for varying the spacing of the contacts whereby the amount of movement required is a function of the speed.

17. In a speed responsive mechanism, in combination, a shaft, a contact disk, a contact making element, gearing for revolving the contact-making element about the shaft, and means to move the contact making element in a direction parallel to the shaft against the contact disk when the shaft decelerates.

18. In a speed responsive mechanism, in combination, a shaft, a disk carried by the shaft, a contact-making element, means for revolving the contact making element about the shaft and for moving it in a direction parallel to the shaft against the disk during the time in which the shaft decelerates.

19. A mechanism for indicating deceleration having in combination, a shaft, and speed responsive mechanisms driven thereby, one comprising a contact member and means responsive to deceleration for moving the contact member toward a second contact member on the other, the other speed responsive mechanism comprising a second contact member and a governor mechanism to increase the distance between the second contact member and the first speed responsive mechanism as a function of the speed.

20. A mechanism for indicating deceleration having in combination, a shaft, speed responsive mechanisms driven thereby, one comprising a contact member and means responsive to deceleration for moving the contact member toward a second contact member on the other, the other speed responsive mechanism comprising a second contact member and a governor mechanism to increase the distance between the second contact member and the first speed responsive mechanism as a function of the speed, and a signal circuit adapted to be closed when the two contact members are brought into engagement.

JOHN M. COLE.